United States Patent Office 3,522,031
Patented July 28, 1970

3,522,031
METHOD OF DESICCATING, DEFOLIATING, AND WILTING LEAVES WITH A SYNERGISTIC MIXTURE OF AROMATIC NAPHTHA AND A SUBSTITUTED TETRAHYDROPYRIMIDINE OR N-ALKYLAMINOPROPYLACETAMIDE
Harold James Miller, Newtown Square, Pa., assignor to Pennwalt Corporation, a corporation of Pennsylvania
No Drawing. Filed Dec. 14, 1967, Ser. No. 690,374
Int. Cl. A01n 5/00, 9/02, 9/22
U.S. Cl. 71—70                              5 Claims

ABSTRACT OF THE DISCLOSURE

Leaf deterioration, such as wilting and desiccation, is accomplished by treating plants with an effective amount of a composition comprising a mixture of aromatic naphtha solvent and an amine selected from the group consisting of:

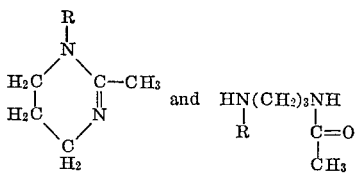

where R is an alkyl radical having 8 to 20 carbon atoms.

---

This invention relates to a composition adapted to the treatment of growing plants to effect leaf deterioration and the method of treating plants therewith. More specifically, this invention concerns a composition comprising a mixture of a substituted pyrimidine or substituted propanediamine, or mixture thereof, and an aromatic naphtha solvent.

Many crop plants, for example, cotton and beans, are treated with chemicals to bring about leaf deterioration before harvesting. The extent of leaf deterioration is generally expressed in the following relative terms:

Wilting—the leaves lose turgor as a result of water loss and become limp, sag, and collapse.
Desiccation—the leaves are essentially completely deprived and exhausted of water and therefore are shriveled and dried up.
Defoliation—the treatment causes the plant to be stripped of leaves which drop off prematurely.

When leaf deterioration is effected by application of chemicals to the plants preparatory to harvesting, the chemical used should accomplish its desired purpose without other injury to the plant. These operations are especially useful in the harvesting of cotton. Recent investigations have indicated that wilting of the cotton plant leaf just prior to spindle machine picking will result in the harvest of a satisfactory quality of lint without serious staining thereof, and, of course, no dry leaf trash contamination known as "peppering." In addition, harvesting can start within three hours after application of the chemical, thus permitting careful timing of harvest to avoid weather hazards. Desiccation of the leaf results in dead or brown condition of leaf tissue. At least three days must elapse before harvesting and then only stripper machine picking can be used in areas where cotton gins are specially equipped to remove the leaf trash. In order to use spindle picker machines, it is necessary to wait about seven days for the mechanical removal of the dead leaves by wind, etc., with the accompanying hazard of longer exposure of the plants to potentially wet weather, which moisture will lower cotton lint grade. Defoliation treatment causes dropping of leaves in three days with or without desiccation. Therefore, the waiting period for use of the spindle machine picker is shortened, which is economically mandatory in high yield cotton producing areas.

The compositions embodied in this invention comprise a mixture of an effective amount of a specific type of amine compound and aromatic naphtha solvent. Generally, the ratio of solvent to amine is within the range of about 1:1 to about 30:1 on a weight basis, preferably about 10:1 to 20:1. The amine is selected from the class consisting of pyrimidines represented by the formula

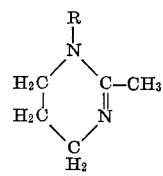

and propanediamines represented by the formula

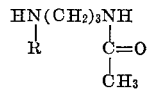

where R is an alkyl group, or mixture of alkyl groups, said alkyl radicals having from 8 to 20 carbon atoms, preferably 10 to 14 carbon atoms. Representative R radicals are decyl, dodecyl, hexadecyl, octadecyl, mixed $C_{10}$–$C_{18}$ alkyl (i.e., R is coco, derived from coconut oil), mixed $C_{16}$–$C_{20}$ alkyl (derived from soybean oil), and the like. Methods of preparing the pyrimidine compounds and the propanediamine compounds are set forth in British Pat. 793,749 and French Pat. 1,415,468. The propanediamine is the intermediate from which the corresponding pyrimidine is derived (by the splitting off of a molecule of water).

The aromatic naphtha solvents which comprise the other essential component of the synergistic mixture of this inventon are a class of well known, commercial solvent materials which are mixtures of benzene, toluene and xylene with significant amounts of higher aromatic homologues.

It has been discovered that the treatment of plants with a mixture of the aforedescribed amine and aromatic naphtha solvent results in a marked and surprising deterioration of the plant leaves, particularly with respect to wilting and desiccation, in comparison to the results obtained with treatment by either the amine or naphtha solvent alone. This unexpected synergism is shown by the illustrative examples which are set forth in the latter portion of this specification.

The method of this invention is conveniently carried out by applying an effective amount of the above-described composition to the foliage of the plants chosen for treatment, generally in the form of dilute dispersions in water or as dispersions or solutions in organic solvents. Formulations may be prepared as emulsion concentrates for dilution with water for field applications. These may be prepared by the use of suitable solvents such as xylene, isophorone, benzene, heptane, heavy mineral oils, kerosene and other solvents immiscible with water, with the addition of a suitable anionic, cationic or non-ionic emulsifying agent such as long-chain alkylbenzenesulfonates or polyglycol ethers. In lieu of said dispersion, or emulsion in water, or oil in water emulsion, the composition can be prepared and applied merely as solution in an organic solvent such as those solvents mentioned above, or in such water-miscible solvents as diacetone alcohol, acetone, dimethyl sulfoxide, dimethyl formamide, phosphoric acid esters, etc. The latter solutions can also be diluted with water to the desired concentrations. In general, the leaf deteriorating composition embodied herein will range in practical applications from about 0.01% to about 25% by weight of the total formulation, based on the weight of the amine component present therein.

The compositions of this invention are especially useful in treating the leaves of such plants as cotton, beans, soybeans, alfalfa, corn, grain sorghum, millet, nursery crops, and the like. The rate of application of the compositions, based on the amine component thereof, can range in general from about one to about ten pounds per acre. The preferred rates are from about two to about five lbs./acre based on the amine compound.

The following examples are set forth to illustrate the invention and not to limit its scope in any way. Proportions of materials are given in percents by weight.

EXAMPLE 1

Formulations comprised as follows were prepared.

|  | Formulation A, percent | Formulation B, percent |
| --- | --- | --- |
| Amine | 5 | 5 |
| Xylene | 90 | 10 |
| Aromatic naphtha solvent [1] |  | 80 |
| Emulsifier [2] | 5 | 5 |

[1] "Solvent FS" (product of Sun Oil Company); a naphtha composed of 97% aromatics and having a distillation range of 450–530° F.
[2] "Triton X-155" (product of Rohm and Haas Company); blend of alkylaryl polyether alcohols with organic sulfonates.

The above formulations were diluted in water as the carrier and applied to two week old bean plants and six months old cotton plants growing in a greenhouse. The rates of application were two pounds and five pounds of amine in 100 gallons of water per acre. Observations were made on wilting three hours after application.

PART I

The amine compound tested was 1-dodecyl-2-methyl-tetrahydropyrimidine having the structure:

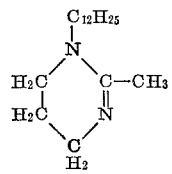

Formulation A at rates of 2 pounds and 5 pounds per acre (based on pyrimidine) showed no wilting and 10% wilting of bean plant leaves, respectively. Formulation B, however, at the same rates produced 50% and 100% wilting of the bean plant leaves.

Formulation A produced 5% wilting of cotton plant leaves at 5 lbs./acre while Formulation B produced 90% wilting at the same rate.

PART II

The amine compound tested was N-(dodecylaminopropyl)acetamide having the formula:

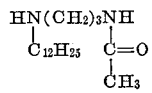

At rates of 5 lbs./acre, Formulation A gave no wilting and 12.5% wilting of bean and cotton plant leaves, respectively. Formulation B, however, produced 100% and 90% wilting of the leaves at the same rates.

EXAMPLE 2

Formulations comprised as follows were prepared:

|  | Formulation | |
| --- | --- | --- |
|  | C, percent | D, percent |
| N-(dodecylaminopropyl)acetamide (N-dodecyl-N¹-acetyl-1,3-propanediamine) | 5 | 5 |
| Xylene | 90 |  |
| Aromatic naphtha solvent ("Solvent FS") |  | 90 |
| Emulsifier ("Triton X-155") | 5 | 5 |

The above formulations were diluted in representative carriers, i.e., water, fuel oil, and non-phytotoxic oil ("Superior Oil"), and applied to cotton plants as in the previous example at rates of 2 and 5 lbs./acre of the propanediamine, the dilution factor being about 100 gallons of the carrier per acre. Formulation C gave only 10% to 50% desiccation of the cotton leaves but Formulation D gave 95% to 100% desiccation, measured 3 hours after application.

EXAMPLE 3

The following formulations were prepared:

|  | Formulation | |
| --- | --- | --- |
|  | E, percent | F, percent |
| N-(dodecylaminopropyl) acetamide | 5 |  |
| Aromatic naphtha solvent | 90 | 95 |
| Emulsifier | 5 | 5 |

The formulations were diluted with water as in Example 1. Formulation E was applied to cotton plants at a rate of 2 lbs./acre of the amine and formulation F was applied at equivalent rates. Formulation F produced only 10% wilting of the leaves, however, formulation E gave 95% wilting.

I claim:

1. The method of desiccating, wilting and defoliating the leaves of growing plants which comprises applying to said leaves an effective amount of a composition consisting essentially of a mixture of an aromatic naphtha solvent having a distillation range of 450° F. to 530° F. and an amine selected from the group consisting of

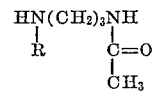

and

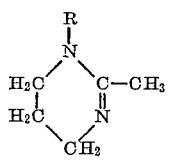

where R is an alkyl radical having from 8 to 20 carbon atoms, the weight ratio of the solvent to the amine in said mixture being within the range of about 10:1 to 20:1.

2. The method of claim 1 wherein the plants are cotton plants.
3. The method of claim 1 wherein the plants are bean plants.
4. The method according to claim 1 wherein the amine is 1-dodecyl-2-methyl-tetrahydropyrimidine.
5. The method according to claim 1 wherein the amine is N-(dodecylaminopropylacetamide.

References Cited

UNITED STATES PATENTS

| 2,586,681 | 2/1952 | McKay et al. | 71—122 |
| 3,135,656 | 6/1964 | Abramitis et al. | 424—251 |
| 3,169,848 | 2/1965 | Gysin et al. | 71—74 |
| 3,396,005 | 8/1968 | Popoff | 71—70 |
| 3,397,052 | 8/1968 | Smith | 71—97 |

FOREIGN PATENTS

| 1,415,468 | 9/1965 | France. |
| 793,749 | 4/1958 | Great Britain. |

LEWIS GOTTS, Primary Examiner

M. M. KASSENOFF, Assistant Examiner

U.S. Cl. X.R.

71—74, 92, 118, 127